United States Patent
Kanakkanatt

[11] Patent Number: 6,165,234
[45] Date of Patent: Dec. 26, 2000

[54] THERMALLY COLOR-CHANGING CANDLES

[76] Inventor: Sebastian V. Kanakkanatt, 2459 Audubon Rd., Akron, Ohio 44320

[21] Appl. No.: 09/274,605

[22] Filed: Mar. 23, 1999

Related U.S. Application Data

[60] Provisional application No. 60/079,470, Mar. 26, 1998.

[51] Int. Cl.[7] ................................ C11C 5/00; C10L 5/00
[52] U.S. Cl. .................................... 44/275; 252/1
[58] Field of Search .................................. 44/275; 252/1

[56] References Cited

U.S. PATENT DOCUMENTS

| | | | |
|---|---|---|---|
| 3,582,251 | 6/1971 | Concannon | 44/275 |
| 4,232,552 | 11/1980 | Hof et al. | 73/356 |
| 4,299,727 | 11/1981 | Hof et al. | 252/408 |
| 4,425,161 | 1/1984 | Shibahashi et al. | 106/21 |
| 4,720,301 | 1/1988 | Kito et al. | 106/21 |
| 4,818,215 | 4/1989 | Taga | 431/126 |
| 5,578,089 | 11/1996 | Elsamaloty | 44/275 |
| 5,879,694 | 3/1999 | Morrison et al. | 424/405 |

FOREIGN PATENT DOCUMENTS 50-023405   3/1975   Japan .

*Primary Examiner*—Margaret Medley
*Assistant Examiner*—Cephia D. Toomer
*Attorney, Agent, or Firm*—Roger D. Emerson; John M. Skeriotis

[57] ABSTRACT

A candle with an excellent attractive effect of color change with the use of positive and negative types of thermochromic dyes which develop a highly dense color on heating to the melting point of wax. These are composed of a plurality of (A) an electron donating chromogenic organic compound, (B) an electron accepting aromatic organic compound, (C) a medium selected from aliphatic alcohols or paraffinic waxes, (D) one or more of oil-based fragrances containing aromatic aldehydes, ketones, or esters, and (E) soluble halides or nitrates of transition metals. By controlling the relative proportions and the physical proximity of a plurality of ingredients from (A) through (E) in a candle or candle wax or other waxes, a color develops from a colorless state giving a positive thermochromic effect, the initial color is erased giving a negative thermochromic effect on heating or when the candle burns. These color changing waxes and candles made therefrom transform from one color shade to another color shade when mixed with conventional oil-based dyes to give a color-to-color effect on heating or melting the wax as the candle burns.

10 Claims, No Drawings

THERMALLY COLOR-CHANGING CANDLES

This application claims benefit to Provisional application Ser. No. 60/079,470 filed Mar. 26, 1998.

BACKGROUND OF THE INVENTION

The present invention relates to imparting reversible color changes to waxes and candles as the temperature is raised, when the wax melts or when the candle burns.

Microencapsulated thermochromic dyes have been used in inks, paints, plastics, and in other vehicles. All hitherto reported thermochromic dyes on heating lose their color and become colorless if they are not microencapsulated or become white if they are microencapsulated, the whiteness being due to the cell wall of the microcapsules containing the thermochromic dye.

Thermochromic dyes undergo reversible electron transfer during heating cooling cycle. This reported mechanism, if correct, makes it generally unsuitable for use with most substrates without first microencapsulating them. The reason for this behavior is attributed to the delicate electron-transfer mechanism which becomes interfered with due to the effect of the substrate in question. It is, therefore, desired to convert this disadvantage of the unmicroencapsulated thermochromic dye into an advantage or to design a composition in which this problem is minimized or eliminated.

PRIOR ART

During our extensive search for prior art in the field of color changing candles, not a single patent showed up which describes a thermally color changing candle. A number of patents, published papers, and proceedings of professional symposia describe the preparation methods of basic thermochromic dyes. For example, U.S. Pat. Nos. 4,028,118 and 4,425,161. One patent recently issued, U.S. Pat. No. 4,818,215 describes a thermally color-changing candle holder. The '215 patent describes a candle holder, a hollow shell, shaped in the form of an animal, fruit, building, etc. which is covered with a thermally color changing material, either partially or wholly. When the shell is heated by burning a candle, the pattern seen by the viewer thus changes. However, the candle itself does not change its color on heating or melting when it is lit. Thus, this invention is unique.

SUMMARY OF THE INVENTION

An object of this invention is to provide a candle or a heated, flame consumable fuel with improved decorative effect.

It is a further object of the present invention to provide the candle with a coloration effect from colorless to a color on heating or melting while the candle burns.

It is a further object of the present invention to provide the candle with a color-erasing effect on heating or melting when the candle burns.

It is a further object of the present invention to provide the candle with a change of one color to another color on heating or melting of the wax when the candle burns.

DESCRIPTION OF THE PREFERRED EMBODIMENTS

A candle that utilizes positive color concentrates (ColorSine™ A) develops a color from a colorless state on heating. The positive thermochromic material (ColorSine A) makes use of a minimum of two of the following ingredients: (A) an electron-donating chromogenic compound, (B) an electron-accepting organic compound preferably aromatic, (C) a carrier in which the electron transfer takes place reversibly, (D) an adjuster and an inverter of coloration selected from aromatic aldehydes, ketones, esters, fragrances with or without these as carriers and combination thereof, and (E) an inorganic salt selected from halides or nitrates of transition metals, alums, and the like.

In the present invention, a color inversion has been achieved which is not encountered with conventional thermochromic materials. Thus a negative thermochromic dye which loses its color on heating can be made to behave in reverse; that is, to become a positive thermochromic dye. Also, a positive thermochromic dye can be made which is independent of the electron transfer mechanism thus rendering them unaffected by most substrates.

The use of this positive thermochromic material (ColorSine A) in waxes or in candles as well as the positive thermochromic material by itself is an aspect of the present invention. This behavior of generating a color from a colorless state on heating is reversible; that is, on cooling the color fades and disappears.

The negative thermochromic material which is given the name "ColorSine B" in this invention is commonly known as "Thermochromic material." This is the one that loses its color on heating above the temperature of its color change. The incorporation of the negative, unmicroencapsulated, thermochromic material in waxes and in candles is an aspect of the present invention. Thus waxes and candles in which a negative, unmicroencapsulated, thermochromic material is incorporated changes color reversibly from an initially colored state to a colorless state without any interference from the substrate on heating or on melting of the wax. This change is reversible; that is, the original color is restored on cooling.

Additives of conventional colors, preferably oil-based, make the wax or candle change from one color to another color reversibly. This effect is made possible in both positive and negative (ColorSine A and B) thermochromic dyes in the present invention.

Additives such as aliphatic or aromatic aldehydes, esters, ketones, alcohols, or combinations thereof to the wax and candles make it possible to control the temperature type, positive or negative (ColorSine™ A or B) nature of the color change.

Another aspect of this invention is a series of positive thermochromic materials which develop a color on heating as a result of complex formation of certain metals with the compounds in the composition with or without the loss of water of hydration. Metal salts such as cobalt chloride form deep blue complexes with several organic solvents such as acetone; but this coloration is more or less permanent. We have discovered a method of effecting this coloration on heating and reversing the color on cooling. Inorganic salts such as cobalt chloride in combination with certain long chain alcohols such as myristyl alcohol produce the unusual effect of coloration due to the complex formation on heating and fading of the color on cooling. The examples of metal salts that can be used in this type of positive thermochromism are, but not limited to, the following: cobalt chloride, Iron (III) chloride, Nickel (II) chloride, water soluble halides, nitrates and nitrites of transition metals, alums, and the like.

DETAILED DESCRIPTION OF THE INVENTION

First Embodiment

A positive thermochromic dye, a positive thermochromic wax, and a candle made therefrom (for which we have given our trade name ColorSine A) is one that generates a color on heating or by melting of wax which contains the positive thermochromic dye. This is made by heating together (A) an acid organic dye or an electron donating chromogenic compound selected from the group and list of samples given below under the heading Compound A; B, an electron accepting compound which has carboxyl, hydroxyl, etc. groups attached to the aromatic ring(s) in their molecule selected from the group and examples given under the heading, Compound B; C, an organic alcohol having long aliphatic straight or branched chains selected from the group and examples given below under the heading Compound C; and D, a compound which adjusts or inverts the positive-negative behavior of the thermochromic dye selected from fragrances or components thereof and from those groups and examples given in the list given below under the heading Compound D.

Compound A can be varied from 0.1 to 25%, the preferred range being varied 2 to 5%, Compound B can be from 0.1 to 30%, the preferred range being 2 to 10%, Compound C can be varied from 1 to 90%, the preferred range being from 10 to 20%, and Compound D can be varied from 2 to 20%, the preferred range being 5 to 10%; Compound E can be varied from 1 to 25%, the preferred range being from 10 to 15%, all percentages being by weight.

Compound A

Specific examples of Compound A include 6-(dimethylamino)-3,3-bis(4-dimethylamino) phenyl-1 (3H)-isobenzofuranone, 2'-di(phenyl methyl) amino-6'-(diethylamino) spiro (isobenzofuran-1(3H), 9'-(9H) xanthan)-3-one, N-(2,3-dichlorophenyl-leuco auramine, N-benzoyl auramine, N-acetyl auramine, N-phenyl auramine, Rhodamine B lactam, 2-(phenylimino-ethylidene)-3,3-dimethyl-indoline, N,3,3-trimethyl-indolinobenzospiropyran, 8'-methoxy-N,3,3-trimethylindolino-spiro-pyran, 3-diethylamino-6-methyl-7-chlorofluoran, 3-diethylamino-7-methoxy-fluoran, 3-dimethylamino-6-benzyloxy-fluoran, 1,2-benzo-6-diethyl aminofluoran, 3,6-di-p-toluidino-4,5-dimethylfluoran-phenyl hydrazide-γ-lactans, 3-amino-5-phenyl-8-methyl-fluoran, 2,3-butylene-6-di-n-butylamino-fluoran, 3-diethylamino-7-anilino-fluoran, 3-diethyl-amino-7-(p-toluidino)-fluoran, 7-acetamino-3-diethylamino-fluoran, 2-bromo-6-cyclo-hexylamino-fluoran, 2,7-dichloro-3-methyl-6-n-butylamino-fluoran, and the like.

Compound B

Specific examples of aromatic compounds having hydroxyl groups which are electron acceptors are given below. These compounds may be substituted with alkyl groups, aryl groups, acyl groups, carboxyl groups, alkoxy-carboxyl groups, halogen atoms, and the like. Specific examples of Compound B include tert-butyl-phenol, dodecyl phenol, nonyl phenol, styrenated phenol, 2,2'-methylene-bis(4-methyl-6-tert-butyl-phenol), α-naphthol, β-naphthol, hydroquinone monoethyl ether, quaiacal, eugenol, p-chlorophenol, p-bromophenol, p-iodophenol, o-chlorophenol, orthobromo-phenol, orthophenyl phenol, p-phenylphenol, p-(p-chlorphenyl)-phenol, o-(o-chlorophenyl)phenol, methyl-p-hydroxybenzoate, ethyl-p-hydroxybenzoate, propyl-p-hydroxybenzoate, octyl-p-hydroxybenzoate, dodecylphenol-3-isopropyl-catechol, p-tert-butyl-catachol, 4, 4'-methylene-diphenol, tetrabromo-4,4'-methylne-diphenol, 4,4'-thio-bis(6-tert-butyl-3-methyl-phenol), bisphenol-A, 1,2-dihydroxynaphthalene, 2,3-dihydroxy-naphthalene, chlorocatechol, bromocatechol, 2,4-dihydroxybenzophenone, phenol, phthalein, o-cresolphthalein, methylprotocalechuate, ethylprotocatechuate, propylprotocatechuate, octylprotocatechuate, dodecylprotocatechuate 2,4,6-trihydroxymethyl-benzene, methyl gallate, ethyl gallate, propyl gallate, butyl gallate, hexyl gallate, octyl gallate, dodecyl gallate, cetyl gallate, 2,3,5-tri-hydroxynaphthalene, tannic acid, phenol-formaldehyde prepolymers, resorcin, phloroglucin, metal and ammonium salts of such phenoxy benzo triazoles such as 5-chlorobenzo triazole, 4-laurylaminosulfobenzo triazole, 5-butylbenzotriazole, dibenzo triazole, 2-hydroxy benzotriazole, 5-carboethoxy-triazole, and metal salts and ammonium salts of such triazoles.

A preferred class of Compound (B) includes alkyl or aryl phenols, diphenols, naphthols, gallic acid esters, and p-oxybenzoic acid alcohol ester, having alkyl moiety of 1 to 12 carbon atoms.

Compound C

Compound C, which acts as a reaction medium or a "solvent," which also controls to a certain degree the temperature of color change and the degree of interconversion of positive-negative thermochromism is selected from long chain aliphatic alcohols. Specific examples of such alcohols include 1-Dodecanol, 1-tetradecanol, 1-Hexadecanol, 1-Docosanol, 1-Decanol, 1-Octadecanol, (2)-9-Octadecen-1-ol, 1-Nonanol, 3-pentadecylcatachol, azomethanes such as benzylideneaniline, benzylidene lauryl amine, etc. anides such as acetamide and stearic acid amide, benzamide, and the like. The preferred alcohols are those which have carbon atoms from 12 to 18 or having molecular weight from 100 to 200.

Compound D

Compound D in this invention is a group of compounds selected from aldehydes, esters, ketones, triglyciderides, and the like. Specific examples of Compound D include cetyl 4-tert-butylbenzoate, behenyl 4-cyclohexylbenzoate, myristyl 4-phenylbenzoate, lauryl 4-octylbenzoate, hexyl 3,5-dimethylbenzoate, butyl 4-benzylbenzoate, octyl 3-methyl-5-chlorobenzoate, decyl 4-isopropylbenzoate, cetyl phenylacetate, phenyl 4-tert-butylbenzoate, 4-chlorobenzyl 2-methyl benzoate, stearyl 4-chlorobenzoate, myristyl 3-bromobenzoate, stearyl 2-chloro-4-bromobenzoate, decyl 3,4-dichlorobenzoate, octyl 2,4-dibromobenzoate, cetyl 3-nitrobenzoate, cyclohexyl 4-aminobenzoate, cy-clohexylmethyl 4-amino benzoate, cetyl 4-diethy-laminobenzoate, decyl 4-methoxybenzoate, cetyl 4-methoxybenzoate, stearyl 4-methoxybenzoate, octyl 4-butoxybenzoate, cetyl 4-butoxybenzoate, 4-methoxybenzyl benzoate, cetyl p-chlorophenylacetate, decyl 3-benzoylpropionate, cyclohexyl 2-benzoylpropionate, myristyl benzoate, cetyl benzoate, 4-chlorobenzyl benzoate, benzyl cinnamate, cyclohexylmethyl cinnamate, benzyl caproate, 4-chloro-benzyl caprate, 4-methoxybenzyl myristate, 4-methoxy benzyl stearate, benzyl palmitate, 4-nitrobenzyl stearate, neopentyl caprylate, neopentyl laurate, neopentyl stearate, neopentyl behenate, cyclohexyl laurate, cyclo-hexyl myristate, cyclo-hexyl palmitate, cyclohexylmethyl stearate, 2-cyclohexyl ethyl stearate, stearyl cyclohexylpropionate, 3-phenylpropyl stearate, 4-methoxybenzyl caproate, 4-methoxybenzyl caprate, 2-chlorobenzyl myristate, 4-isopropylbenzyl stearate, phenyl 11-bromolaurate, 4-chlorophenyl 11-bromolaurate, didecyl adipate,, dilauryl adipate, dimyristyl adipate, dicetyl adipate, distearyl adipate, dibenzyl sebacate, distearyl tere-phthalate, dineopentyl 4,4'-diphenyl-dicarboxylate, 4-tert-butylbenzaldehyde, 4-cyclohexyl benzaldehyde, 4-phenyl benzaldehyde, 4-octyl benzaldehyde, 3,5-dimethyl benzaldehyde, 4-octyl benzaldehyde, 3,5-dimethyl benzaldehyde, 4-benzyl benzaldehyde 3-methyl-5-chlorobenzaldehyde, 4-iso-propyl benzaldehyde, phenyl acetaldehyde, 4-tert-butyl benzaldehyde, 3-bromobenzaldehyde, 2-chloro-4-bromobenzaldehyde, 3,4-dichloro-benzaldehyude, 2,4-dibromobenzaldehyde, 3-nitro-benzaldehyde, 4-aminobenzaldehyde, 4-diethyl aminobenzaldehyde, 4-methoxy-benzaldehyde, 4-butoxybenzaldehyde, p-chlorophenylacetaldehyde, 3-benzoyl propionaldehyde, 2-benzoyl proprionaldehyde, cinnamaldehyde, caproaldehyde, myristaldehyde, dilaurin, dimiristin, distearin, dibehanin, dipalmitin, trilaurin, tri myristin, tristearin, tripalmitin, tribehanin, benzophenone, dibenzyl ketone, methyl phenyl ketone, cetyl benzyl ketone, myristyl 4-phenyl benzyl ketone, 4-cyclohexyl benzyl ketone, lauryl 4-octylbenzyl ketone, hexyl 3,5-dimethyl benzyl ketone, butyl 4-benzylketone, and the like.

Second Embodiment

Another series of positive thermochromic, which also is one aspect of this invention, is the formation of color development on heating resulting from a complex formation of certain metal salts with certain organic compounds. Metal salts such as cobalt chloride change color irreversibly from light pink to blue on reaction with organic solvents such as acetone. We have discovered that this color change can be effected on heating the metallic salt in combination with certain long chain alcohols such as myristyl alcohol and also made reversible on cooling. The examples of metal salts that can be used in this type of positive thermochromism are, but not limited to, the following: cobalt chloride; Iron (III) chloride; Nickel (II) chloride, water soluble halides, nitrates of transition metals, and alums which undergo a color change either when they lose the water of hydration or when they form complexes with organic materials.

The details of the present invention are illustrated in the following examples and tables: Table 1 gives a partial list of examples of electro-donating chromogenic compounds (Compound A):

TABLE 1

Specific Examples of Electron Donating Chromogenic Compounds, Compound A

| No. | Name | Color |
|---|---|---|
| 1. | 6-(Dimethylamino)-3,3-bis(4-dimethylamino)phenyl-1(3H)-isobenzofuranone | Blue |
| 2. | 3,3-Bis(1-butyl-2-methyl-1H-indol-3-yl-1-(3H)-isobenzofuranone | Magenta |
| 3. | 2'-Di(phenylmethyl)amino-6'-(diethylamino)spiro(isobenzofuran-1(3H),9'-(9H)xanthan)-3-one | Green |
| 4. | 2-Anilino-3-methyl-6-diethylaminofluoran | Black |
| 5. | 3-(4-Dimethylamino)phenyl-3-(di(4-octyl)phenyl amino)-1-(3H)-isobenzofuranone | Orange |
| 6. | N-(2,3-dichlorophenyl-leuco auramine | Yellow |

TABLE 2

Specific Examples of Electron-Accepting Compounds (Compound B)

| No. | Name |
|---|---|
| 1. | 2,2-bis(4-hydroxyphenyl) propane |
| 2. | tert-butylphenol |
| 3. | 2,2'-methylene-bis(4-methyl-6-tert-butylphenol) |
| 4. | 3,4,5,6-Tetrabromo-o-cresol |
| 5. | 2,2-bis(4-hydroxyphenyl)-1,1,3,3-tetrabromopropane |
| 6. | p-(p-Chlorophenyl)-phenol A |
| 7. | 2,2-bis(4-hydroxyphenyl) butane |

TABLE 3

Specific Examples of Media or Solvent (Compound C)

| No. | Name |
|---|---|
| 1. | 1-Decanol |
| 2. | 1-Dodecanol |
| 3. | 1-Tetradecanol |
| 4. | 1-Nonanol |
| 5. | 1-Docosanol |
| 6. | (2)-9-Octadecen-1-ol |
| 7. | 3-pentadecylcatechol |

TABLE 4

Specific Examples of Compounds Used as Adjusters and/or Inverters of Coloration (Compound D)

| No. | Name |
|---|---|
| 1. | Benzaldehyde |
| 2. | Diphenylketene |
| 3. | 4,4-Diphenyl-6-(1-pipexidinyl)-3-hepanone |
| 4. | Dipropyl ketone |
| 5. | Amyl acetate |
| 6. | Benzyl benzoate |
| 7. | 1-Tetradecyl-1-tetradecanoate |
| 8. | Tristearin |
| 9. | Trilaurin |
| 10. | Tripalmitin |

TABLE 5

Examples of Soluble Metallic Halides and Nitrates of Transition Metals (Ingredient E)

| No. | Name | No. | Name |
|---|---|---|---|
| 1. | Cobalt(II) chloride | 8. | Cobalt(III) chloride |
| 2. | Iron(III) nitrate | 9. | Cobalt(III) nitrate |
| 3. | Nickel(II) chloride | 10. | Iron(II) chloride |
| 4. | Iron(III) chloride | 11. | Iron(III) bromide |
| 5. | Cobalt(II) nitrate | 12. | Nickel(II) phthalocyanine |
| 6. | Nickel(II) nitrate | 13. | Nickel(II) sulfamate |
| 7. | Aluminum potassium sulfate | 14. | Nickel(II) sulfate |
| | | 15. | Nickel(II) oxalate |

TABLE 6

Specific Examples of Formula to Make Color Concentrates of Positive
Thermochromic (ColorSine A) and Negative Thermochromic
(ColorSine B) Material.
The letters A, B, and C refer to the letters for the type of ingredients; the
numbers outside the parentheses refer to the compound number in the
appropriate table; the numbers in the parentheses represent quantities in
parts per hundred.

| Example No. | A (See Table 1) | B (See Table 2) | C (See Table 3) | Color |
|---|---|---|---|---|
| 1 | 1 (8.0) | 4 (17) | 2 (75) | Blue |
| 2 | 3 (4.0) | 4 (17) | 2 (79) | Green |
| 3 | 5 (10.0) | 4 (20) | 2 (70) | Orange |
| 4 | 2 (6.0) | 4 (18) | 2 (76) | Magenta |
| 5 | 4 (5.0) | 4 (19) | 2 (76) | Black |

TABLE 7

Specific Examples of Formulas to Make Positive Thermochromic
(ColorSine A) Wax.
The numbers outside the parentheses refers to the number of the
compound in the appropriate table; the numbers in the parentheses
represent the quantities in parts per hundred.

| Example No. | Color Concentrate (From Table 6) | Ingredient D | Wax | Color Change |
|---|---|---|---|---|
| 6 | 1 (3) | 1 (6) | (91) | Blue |
| 7 | 2 (3) | 2 (5) | (92) | Green |
| 8 | 3 (3) | 3 (6) | (91) | Orange |
| 9 | 4 (3) | 1 (6) | (91) | Magenta |
| 10 | 5 (3) | 2 (5) | (92) | Black |

TABLE 8

The following are examples of formulas to make concentrate of Positive
(ColorSine A) thermochromic material of the second series, those which
contain metal atoms. The numbers outside the parentheses refer to the
compounds in the appropriate table; the numbers in the parentheses
represent the quantities in parts per hundred. The letters represent the
type of ingredients.

| Example No. | C (See Table 3) | E (See Table 5) | Color Change |
|---|---|---|---|
| 11 | 2 (90) | 1 (10) | White-blue |
| 12 | 2 (80) | 1 (20) | Pink-blue |
| 13 | 2 (80) | 2 (20) | Yellow-red |
| 14 | 2 (80) | 3 (20) | White-green |

TABLE 9

Following are examples of formulas to make positive (ColorSine A)
thermochromic wax and candles. The numbers outside the parentheses
refer to the example number in the appropriate table; the numbers inside
the parentheses represent quantities in parts per hundred.

| Example No. | Color Conc. See Table 6 | Wax | Color Change |
|---|---|---|---|
| 15 | 11 (3) | (97) | White-blue |
| 16 | 12 (3) | (97) | White-blue |
| 17 | 13 (10) | (90) | Yellow-red |
| 18 | 14 (10) | (90) | White-green |

TABLE 10

Following are examples of formulas to make concentrates for negative
(ColorSine B) candle wax. The numbers outside the parentheses refer to
the compound in the appropriate table; the numbers inside the
parentheses represent quantities in parts per hundred.

| Example No. | A (See Table 1) | B (See Table 2) | C (See Table 3) | Color |
|---|---|---|---|---|
| 19 | 2 (6.0) | 4 (8.0) | 2 (86) | Magenta |
| 20 | 3 (6.0) | 4 (8.0) | 2 (86) | Green |
| 21 | 1 (6.0) | 4 (8.0) | 2 (86) | Blue |
| 22 | 4 (6.0) | 4 (8.0) | 2 (86) | Black |
| 23 | 5 (8.0) | 4 (8.0) | 2 (84) | Yellow |

TABLE 11

Following are examples of formulas for making negative thermochromic
(ColorSine B) candle wax.

| Example No. | Concentrate From Table 10 | Ingredient D Table 4 | Wax | Colored Wax |
|---|---|---|---|---|
| 24 | 19 (10) | 1 (1) | (69) | (20) |
| 25 | 20 (10) | 1 (1) | (69) | 20 |

DETAILS OF PREPARATION

Examples 1 through 5, of color concentrates, are made as described below by example 1.

8.0 g of crystal violet lactone, 17.0 g of Bisphenol A and 75 g. of Myristyl alcohol are heated together in a glass vessel until all ingredients are melted and the liquid is colorless. The molten mass is cooled and stored as color concentrate. This will be a deep blue solid.

Examples 6 through 10 are made as follows, illustrated by the preparation of example 6.

3 g. of color concentrate prepared as in example 1, 6 g. of Seafoam and 91 grams of candle wax are heated together with stirring until all ingredients are melted, which takes place at about 80° C.; then the temperature is raised to 110° C. and the molten mass is stirred until all color disappears. The molten mass is poured into candle molds and allowed to cool. When this cools, it will develop an intense blue color in the neighborhood of 70° C.; this color will disappear when the wax solidifies and cools to room temperature. This will turn blue on heating and revert back to white on cooling. Examples 11 through 14 are made as in the following example.

90 g. of Myristyl alcohol and 10 g. of cobalt chloride are heated until all ingredients are melted into a deep blue liquid. On cooling, this will become a pink solid.

Examples 15 through 18 are illustrated by the preparation of example 15.

3 g. of the concentrate prepared as in example 11 and 97 grams of candle wax are melted together. The molten mass, which will be blue in color, is poured into a candle mold and allowed to cool. When cooled, the candle so formed will be light pink in color.

Note: Standard, conventional, non-thermochromic dyes, pigments, glitters, or combinations thereof can be added to examples 1 through 25 for added ornamentation and enhancement to the concentrate, wax, or to the candles made therefrom.

What is claimed is:

1. A thermochromic composition, said composition comprising:

a) an electron-donating chromogenic material;

b) an electron accepting material;

c) a compound selected from the group consisting of organic esters, aldehydes, ketones, and combinations thereof; and whereby the composition is a reversible, positive, non-microencapsulated thermochromic composition which develops a brilliant color of high density from a colorless state on heating.

2. The composition according to claim 1 further including a metallic salt selected from the group consisting of halides and nitrates of transition elements and/or alums.

3. A candle wax, said candle wax comprising:

a) an electron-donating chromogenic material;

b) an electron accepting material;

c) paraffinic wax;

d) a compound selected from the group consisting of organic esters, aldehydes, ketones, and combinations thereof; and whereby the candle wax is a reversible, positive, non-microencapsulated thermally changing candle wax which develops a brilliant color of high density on heating.

4. The wax of claim 3 formed into a candle.

5. The wax of claim 4 further including a metallic salt selected from halides and nitrates of transition elements and/or alums.

6. The wax of claim 4, further including conventional dyes and/or pigments.

7. A composition, said composition comprising:

a) an electron-donating chromogenic organic compound;

b) an electron-accepting organic compound;

c) an immobilization/reaction medium or solvent selected from aliphatic alcohols;

d) additional ingredients selected from the group consisting of aromatic aldehydes or dialdehydes, esters, or ketones and combinations thereof; and whereby the composition is a reversible, non-microencapsulated, color-changing material containing a negative thermochromic material which develops a brilliant color of high density from a colorless state on heating.

8. The composition of claim 7 further including a wax.

9. The composition of claim 8, formed into a candle.

10. The composition according to claim 1 further including a fragrant compound selected from the group consisting of organic esters, ketones, aldehydes or combinations thereof.

* * * * *